US009518872B2

(12) United States Patent
Rogers et al.

(10) Patent No.: US 9,518,872 B2
(45) Date of Patent: Dec. 13, 2016

(54) THERMAL SENSOR

(71) Applicant: Kidde Technologies, Inc., Wilson, NC (US)

(72) Inventors: Aaron S. Rogers, Surf City, NC (US); Chris G. Georgoulias, Raleigh, NC (US); Scott K. Newlin, Willow Spring, NC (US)

(73) Assignee: Kidde Technologies, Inc., Wilson, NC (US)

( * ) Notice: Subject to any disclaimer, the term of this patent is extended or adjusted under 35 U.S.C. 154(b) by 150 days.

(21) Appl. No.: 14/514,248

(22) Filed: Oct. 14, 2014

(65) Prior Publication Data

US 2016/0103022 A1  Apr. 14, 2016

(51) Int. Cl.
| | | |
|---|---|---|
| *G01K 7/00* | (2006.01) | |
| *G01K 7/16* | (2006.01) | |
| *B05D 1/18* | (2006.01) | |
| *B05D 3/12* | (2006.01) | |
| *G01K 3/00* | (2006.01) | |
| *G01K 11/06* | (2006.01) | |

(52) U.S. Cl.
CPC . *G01K 7/16* (2013.01); *B05D 1/18* (2013.01); *B05D 3/12* (2013.01); *G01K 3/005* (2013.01); *G01K 11/06* (2013.01)

(58) Field of Classification Search
None
See application file for complete search history.

(56) References Cited

U.S. PATENT DOCUMENTS

| | | | |
|---|---|---|---|
| 5,078,475 A * | 1/1992 | Sekimura | G02F 1/133345 349/106 |
| 5,793,293 A | 8/1998 | Melamud et al. | |
| 2003/0230337 A1* | 12/2003 | Gaudiana | H01G 9/2031 136/256 |
| 2006/0000294 A1* | 1/2006 | Ohta | G01C 19/5719 73/862.08 |
| 2007/0231796 A1* | 10/2007 | Majda | C12Q 1/6825 435/6.16 |
| 2011/0134958 A1 | 6/2011 | Arora et al. | |
| 2013/0229612 A1* | 9/2013 | Gayout | E06B 9/24 349/193 |
| 2014/0340430 A1* | 11/2014 | Telfer | G09G 3/344 345/690 |

FOREIGN PATENT DOCUMENTS

| | | |
|---|---|---|
| EP | 1777503 A1 | 4/2007 |
| FR | 2986777 A1 | 8/2013 |

OTHER PUBLICATIONS

Extended European Search Report dated Feb. 22, 2016, issued on corresponding European Patent Application No. 15189742.8 (8 pages).

* cited by examiner

*Primary Examiner* — Andre Allen
(74) *Attorney, Agent, or Firm* — Locke Lord LLP; Scott D. Wofsy; Daniel J. Fiorello

(57) ABSTRACT

A thermal sensor includes a first electrode, a second electrode, and a plurality of beads disposed between the first electrode and the second electrode, the beads defining bead cavities between each other. A method for manufacturing a thermal sensor includes disposing a plurality of beads on an inner electrode, dip coating the inner electrode with beads using a molten state changing material, and disposing an outer electrode over the inner electrode and beads after dip coating.

14 Claims, 2 Drawing Sheets

THERMAL SENSOR

BACKGROUND

1. Field

The present disclosure relates to sensors and more particularly to thermal/overheat sensing in aircraft, land based applications, and in vehicles.

2. Description of Related Art

Thermal sensing in aircraft components (e.g., a hot air duct from an engine for environmental control) can utilize heat-sensing elements disposed therein for monitoring the components for overheating. Current duct leak overheat detection systems (DLODS) use a nickel-containing inner core electrode and an Inconel® 625 outer sheath electrode separated by a granular, porous ceramic or glass layer. This granular, porous ceramic layer is filled with a salt mixture and acts as an electrical barrier between electrodes when exposed below a threshold temperature. The salt mixture melts at a threshold temperature and causes an electrical connection between the inner electrode and the outer electrode such that the salt mixture is a heat-sensing element.

However, in traditional sensors, the ceramic layer is broken inside the sheath layer randomly and the salt mixture is distributed randomly throughout the ceramic layer, which can potentially cause inconsistent performance. Also, the random breaking of the ceramic layer and bending of the sensor can lead to portions where the outer electrode is closer to the inner electrode which changes the axial capacitance causing difficulty in locating failures in the sensor.

Such conventional methods and systems have generally been considered satisfactory for their intended purpose. However, there is still a need in the art for improved thermal sensors. The present disclosure provides a solution for this need.

SUMMARY

In at least one aspect of this disclosure, a thermal sensor includes a first electrode, a second electrode, and a plurality of beads disposed between the first electrode and the second electrode, the beads defining bead cavities between each other. The thermal sensor can include a state changing material disposed in the bead cavities, wherein the state changing material transitions between a non-conductive state to a conductive state at a threshold temperature, wherein, in the conductive state, the state change material electrically connects the first and second electrodes.

The first and second electrodes can be coaxial electrodes. The first and second electrodes can include aluminum, Inconel 625, or any other suitable material.

The beads can include at least one of a ceramic or a high temperature polymer or any other suitable material. The beads can include at least one of a glass fiber, polytetrafluoroethylene (PTFE), polyetheretherketone (PEEK), polyetherimide (PEI), polyphenylsulfone (PPSU), or polysulfone (PSU). In certain embodiments, the beads can be porous for absorbing the state change material. The state changing material can include a eutectic salt mixture.

In at least one aspect of this disclosure, a method for manufacturing a thermal sensor includes disposing a plurality of beads on an inner electrode, dip coating the inner electrode with a molten state changing material, and disposing an outer electrode over the inner electrode and beads after dip coating. Dip coating can include dip coating the beads in a molten or aqueous salt mixture. Dip coating can include dip coating the beads in a molten or aqueous eutectic salt mixture.

Disposing an outer electrode over the inner electrode can include coaxially disposing the outer electrode over the inner electrode. In certain embodiments, disposing the plurality of beads on the inner electrode includes sliding the beads onto the inner electrode. Disposing the plurality of beads on the inner electrode can include forming the beads around the inner electrode.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
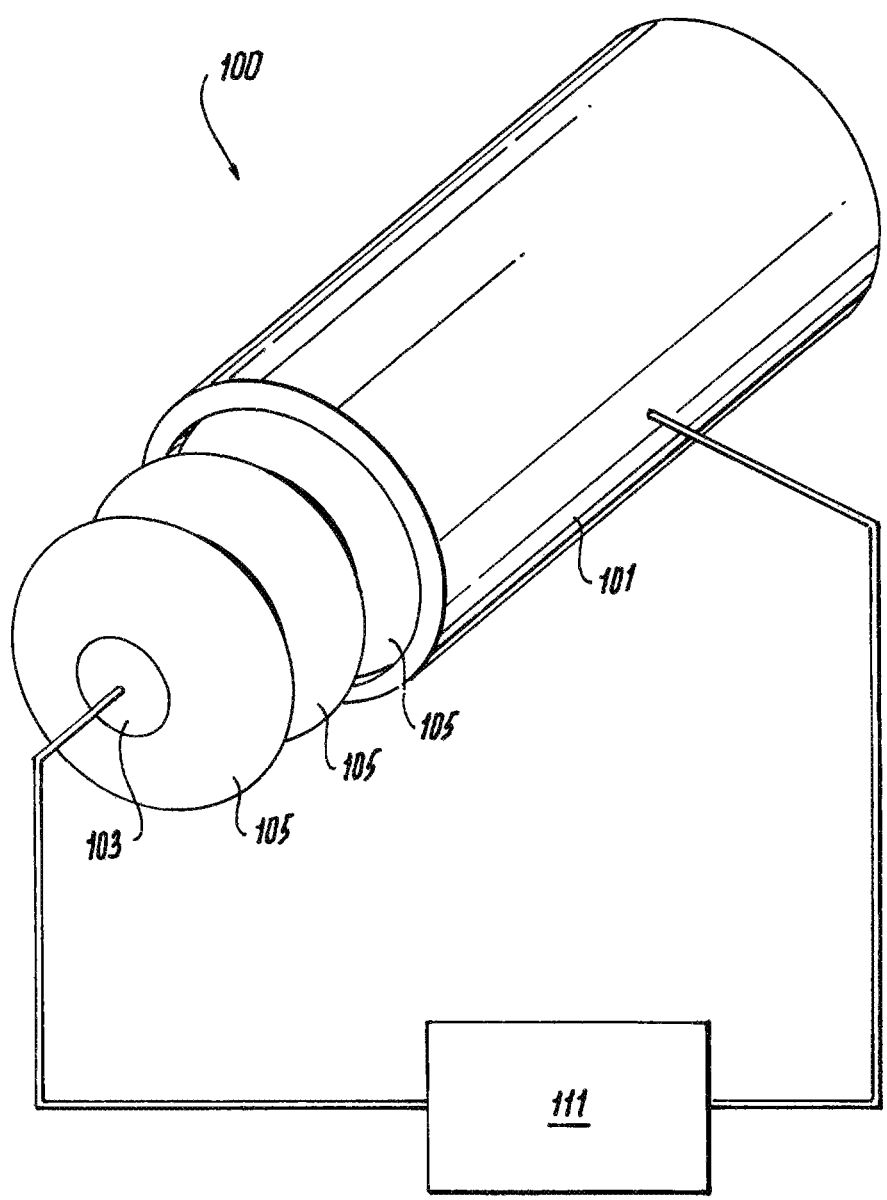
FIG. 1 is a perspective, partial cross-sectional view of an embodiment of a thermal sensor in accordance with this disclosure, showing the thermal sensor electrically connected to a signal processing device.
Figure 2:
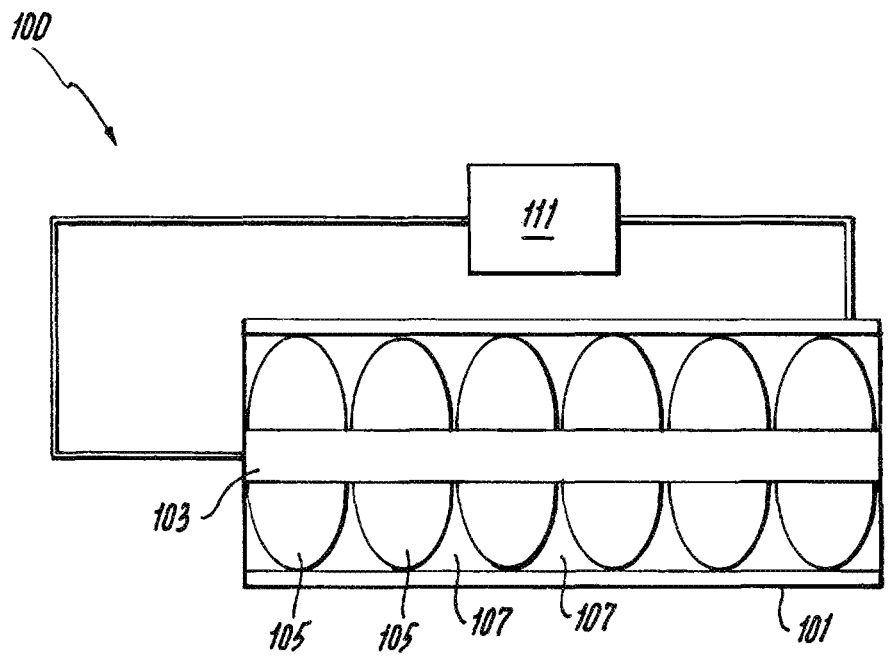
FIG. 2 is a cross-sectional side view of the embodiment of a thermal sensor of FIG. 1.
Figure 3:
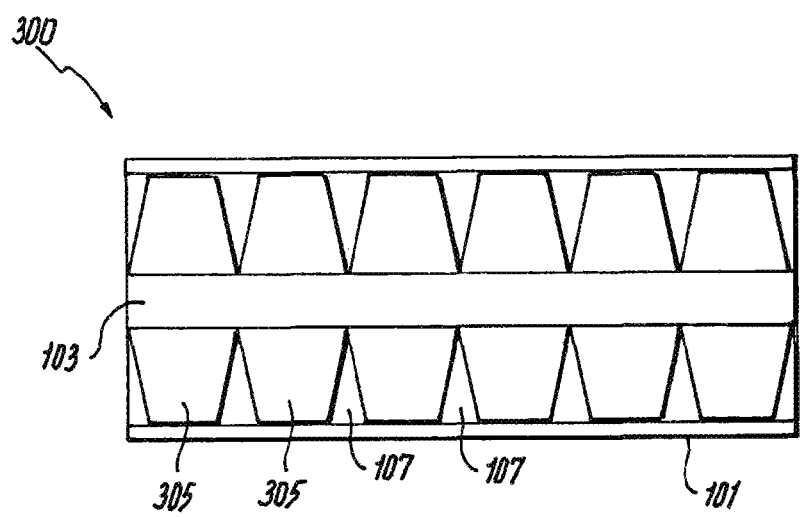
FIG. 3 is a cross-sectional side view of another embodiment of a thermal sensor in accordance with this disclosure.

Reference will now be made to the drawings wherein like reference numerals identify similar structural features or aspects of the subject disclosure. For purposes of explanation and illustration, and not limitation, a perspective view an embodiment of the thermal sensor in accordance with the disclosure is shown in FIG. 1 and is designated generally by reference character 100. Other aspects or embodiments of this disclosure are shown in FIGS. 2 and 3. The systems and methods described herein can be used to sense a temperature or indicate a threshold temperature, e.g., in an aircraft component and/or system.

Referring to FIGS. 1 and 2, in at least one aspect of this disclosure, a thermal sensor 100 includes an outer electrode 101, an inner electrode 103, and a plurality of beads 105 disposed between the outer electrode 101 and the inner electrode 103. As shown, one or both of the outer and inner electrodes 101, 103 can be cylindrical electrodes and/or coaxial electrodes. It is contemplated that the inner and outer electrodes 101, 103 can be manufactured to any other suitable shape and arrangement. The outer and inner electrodes 101, 103 can be made of aluminum, Inconel 625, or any other suitable material. In certain embodiments the outer and inner electrodes can include different materials (e.g., the outer electrode 101 includes Inconel 625 and the inner electrode 103 includes a different material).

The beads 105 can have any suitable shape, and a single sensor 100 may include multiple shapes of beads 105. As shown in FIG. 1, the beads 105 can be ovular. In another embodiment shown in FIG. 3, a sensor 300 can include beads 305 that have a chamfered shape. Any other suitable shape is contemplated herein (e.g., toroidal, spherical).

The shape, size, and/or other characteristics of the beads 105 can be selected to achieve a desired impedance and/or resistance of the sensor 100. For example, the morphology, thickness, porosity, cross-sectional shape, chamfer, or other properties can be modified to change the electrical and physical characteristics of the sensor 100 and/or the size and shape of the bead cavities 107.

In some embodiments, the beads 105 could include a granular ceramic, glass or a granular high temperature polymer. The form of the granular ceramic or polymer may exist as a mesh, fibers, or membrane structure. A suitable polymeric material includes high temperature polytetrafluoroethylene (PTFE), and suitable ceramic materials include non-conducting metal oxides such as alumina, and glass. In other embodiments, the beads 105 can include any other suitable material.

In some embodiments, the beads 105 can further include one of a porous ceramic or a high temperature polymer with induced porosity, as for example a polymer foam. In embodiments using porous ceramic, the porous ceramic can include glass fiber or any other suitable porous ceramic in membrane form. In embodiments using a high temperature polymer, the high temperature polymer can include polytetrafluoroethylene (PTFE), polyetheretherketone (PEEK), polyetherimide (PEI), polyphenylsulfone (PPSU), and/or polysulfone (PSU), and/or any other suitable high temperature polymer.

The beads 105 are arranged such that bead cavities 107 are defined therebetween. A state changing material (not shown) can be disposed between the beads 105 in the bead cavities 107 in any suitable manner (e.g., dip coating, filling) such that the state changing material is configured to transition between a non-conductive state to a conductive state at a threshold temperature to allow conduction between the outer electrode 101 and the inner electrode 103 above the threshold temperature.

The state changing material converts from a solid to a liquid and completes an electrical connection which results in a sensor output. The state changing material can include a eutectic salt, a salt mixture, a conducting polymer film, and/or any other suitable phase/state changing material.

The state changing material (e.g., a salt mixture, a eutectic salt mixture) can be selected to provide a melting temperature at a desired threshold temperature (e.g., about 99.5 degrees Celcius for the above ratio).

As shown, the state changing material can be contained between the outer electrode 101 and the inner electrode 103 and/or the beads 105. The beads 105 and the state change material can be sealed in between the outer electrode 101 and the inner electrode 103 by a sealant at one or both ends of sensor 100. The sealant can include a perfluoro-elastomer or any other suitable high temperature sealant that has a melting temperature above the state change material.

Referring to FIGS. 1 and 2, the sensor 100 can be electrically connected to a signal processing system 111 configured to determine an impedance, resistance, voltage, current, or other electrical characteristic of the sensor 100. As shown, the outer electrode 101 and the inner electrode 103 can be electrically connected to the signal processing system 111 in any suitable means. The signal processing system 111 can include any suitable circuitry hardware, software, and/or the like for receiving and/or processing electrical signals.

As described above, the sensor 100 can be used to determine temperature (e.g., through impedance measurements or other suitable electrical analysis) and/or that a temperature threshold has been exceeded because below a threshold temperature, the beads 105 acts as the electrical insulator between the electrodes such that an electrical signal is prevented from passing therethrough. When the threshold temperature is reached or exceeded, the state change material melts and closes the circuit between the outer electrode 101 and the inner electrode 103 by melting within the beads cavities 105 and/or diffusing through the beads 105 themselves if the beads 105 are porous. Signal processing system 111 can determine when this occurs and signal a suitable system (e.g., an on-board computer) or any other suitable indicator to indicate that a temperature where the sensor 100 is located exceeds the threshold temperature.

The sensor 100 can be mounted to (e.g., via high temperature bonding) or positioned in an aircraft system (e.g. a duct) e.g., in near a hot air duct wall, thereby reducing the response time of the sensor 100. Due to the beads 105, the disclosed sensor design can have higher geometric flexibility while maintaining the inner electrode at equal distances from the outer electrode, allowing to be conformed to the shape of the duct-run without risk reducing functionality. Additionally, the state change material is evenly distributed in the sensor 100 allowing for reliable, predictable performance and increased accuracy.

The beads 105 can also be used in any other suitable linear thermal sensors such as a thermistor, gas expansion thermal sensor, or the like, with or without a state-change material.

In at least one aspect of this disclosure, a method for manufacturing a thermal sensor 100 includes disposing a plurality of beads 105 on an inner electrode 103, dip coating the inner electrode 103 a molten state changing material, and disposing an outer electrode 101 over the inner electrode 103 and beads 105 after dip coating. Dip coating can include dip coating the beads 105 in a molten or aqueous salt mixture (e.g., a eutectic salt). Any other suitable method to dispose state change material on the beads 105 and/or to coat the beads 105 and/or the inner electrode 103 with state change material is contemplated herein (e.g., filling the cavities 107 after inserting the inner electrode 103 and beads 105 into the outer electrode 101).

Disposing an outer electrode 101 over the inner electrode 103 can include coaxially disposing the outer electrode 101 over the inner electrode 103. In certain embodiments, disposing the plurality of beads 105 on the inner electrode 103 includes sliding the beads onto the inner electrode 103. In other embodiments, disposing the plurality of beads 105 on the inner electrode 103 can include forming the beads 105 around the inner electrode 103.

The methods, devices, and systems of the present disclosure, as described above and shown in the drawings, provide for a thermal sensor with superior properties including lighter weight and faster response time. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A thermal sensor, comprising:
   a first electrode;
   a second electrode; and
   a plurality of beads disposed between the first electrode and the second electrode, the beads defining bead cavities between each other; and a state changing material disposed in the bead cavities, wherein the state changing material transitions between a non-conductive state to a conductive state at a threshold temperature, wherein, in the conductive state, the state change material electrically connects the first and second electrodes.

2. The thermal sensor of claim 1, wherein the first and second electrodes are coaxial electrodes.

3. The thermal sensor of claim 1, wherein the first and second electrodes include aluminum or Inconel 625.

4. The thermal sensor of claim 1, wherein the beads can include at least one of a ceramic or a high temperature polymer.

5. The thermal sensor of claim 1, wherein the beads includes at least one of a glass fiber, polytetrafluoroethylene (PTFE), polyetheretherketone (PEEK), polyetherimide (PEI), polyphenylsulfone (PPSU), or polysulfone (PSU).

6. The thermal sensor of claim 1, wherein the beads are porous for absorbing the state change material.

7. The thermal sensor of claim 1, wherein the state changing material includes a salt mixture.

8. The thermal sensor of claim 7, wherein the salt mixture is a eutectic salt mixture.

9. A method for manufacturing a thermal sensor, comprising:

disposing a plurality of beads on an inner electrode;
dip coating the inner electrode with beads using a molten state changing material; and
disposing an outer electrode over the inner electrode and beads after dip coating.

10. The method of claim 9, wherein dip coating includes dip coating the beads in a molten or aqueous salt mixture.

11. The method of claim 9, wherein dip coating includes dip coating the beads in a molten or aqueous eutectic salt mixture.

12. The method of claim 9, wherein disposing an outer electrode over the inner electrode includes coaxially disposing the outer electrode over the inner electrode.

13. The method of claim 9, wherein disposing the plurality of beads on the inner electrode includes sliding the beads onto the inner electrode.

14. The method of claim 9, wherein disposing the plurality of beads on the inner electrode includes forming the beads around the inner electrode.

* * * * *